Patented June 16, 1953

2,642,409

UNITED STATES PATENT OFFICE 2,642,409

PRODUCTION OF MOLDABLE COMPOSITIONS COMPRISING AN UNSATURATED ALKYD AND KAOLIN COATED WITH A HETEROCYCLIC AMINE-FORMALDEHYDE RESIN

David E. Cordier, Toledo, Ohio, assignor to Libbey-Owens-Ford Glass Company, Toledo, Ohio, a corporation of Ohio No Drawing. Application May 15, 1951,
Serial No. 226,537

7 Claims. (Cl. 260—39)

The invention relates to the production of a molding composition that gives molded articles having superior water resistance and electrical properties.

A polymerizable unsaturated alkyd (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperatures is a great handicap in fabricating operations. By the time a urea-formaldehyde or phenol-formaldehyde composition has reached a fused state in a fabricating operation, its hardening already has begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

The resinous state of a polymerizable unsaturated alkyd makes it possible to employ the alkyd in a molding operation either alone or in admixture with a filler. A non-resinous liquid composition, such as a diallyl ester, cannot be used in a molding operation because it would be squeezed out of the filler and squirted out of the mold.

A saturated heat-hardenable alkyd, such as glycerol phthalate, is hardened by esterification with elimination of water. An alkyd that is hardened by esterification cannot be employed to make a molded article or other solid body because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated alkyd hardens by polymerization without the evolution of volatiles.

For the foregoing reasons, a polymerizable unsaturated alkyd is particularly well adapted for many industrial uses. However, a polymerizable unsaturated alkyd has certain physical and chemical properties which leave something to be desired. For example, articles made from a molding composition containing such an alkyd tend to have inferior water resistance and electrical properties.

The principal object of the invention is the production of a novel polymerizable unsaturated alkyd molding composition that gives molded articles having superior water resistance and electrical properties. More specific objects and advantages are apparent from the description, which illustrates and discloses but is not intended to limit the invention.

Among the most useful articles produced from synthetic resins are those in which a filler is present. The filler may be a cellulosic material such as alpha cellulose, or a mineral material in the form of small granules, such as clay, mica, silica or ground glass, or a mineral material in fiber form such as glass fiber or asbestos. Although the presence of a filler in a hardened synthetic resin may cause a substantial improvement in strength, the filler may still leave much to be desired in the electrical properties and water resistance of the hardened composition. For example, cellulose fibers are known to be useful as fillers in certain synthetic resins and to impart great strength to such resins because the resins adhere well to such fibers, but the natural attraction for moisture possessed by cellulose fibers limits the possibility of obtaining good water resistance and electrical properties in synthetic resins containing such fibers. On the other hand, mineral fillers, i. e., fibrous or non-fibrous fillers derived from a mineral source, do not possess a natural attraction for moisture as great as that of cellulose fibers.

Even impregnating a cellulose fiber with a melamine-formaldehyde resin before it is used in a polymerizable unsaturated alkyd molding composition does not overcome the natural affinity of the cellulose fibers for moisture. However, a slight improvement in the water resistance and electrical properties of articles molded from a cellulose-filled polymerizable unsaturated alkyd molding composition can be obtained by pre-impregnation of the filler with a melamine-formaldehyde resin, because of a cellulose filler is capable of absorbing a substantial proportion of a melamine-formaldehyde resin.

The slight improvement in the water resistance and electrical properties of articles molded from a cellulose-filled polymerizable unsaturated alkyd molding composition that can be obtained by pre-impregnating the filler with a melamine-formaldehyde resin is not generally obtainable by the use of such a resin to pre-treat the filler in a mineral-filled polymerizable unsaturated alkyd molding composition.

For example, the use of a melamine-formaldehyde resin to pre-treat a glass fiber filler for incorporation in a polymerizable unsaturated alkyd molding composition does not appear to give molded articles having appreciably better water resistance and electrical properties than the molded articles produced from a polymerizable unsaturated alkyd molding composition containing an untreated glass fiber filler.

The fact that the melamine-formaldehyde resin pretreatment of a glass fiber filler fails to improve the water resistance or electrical properties of articles molded from a polymerizable unsaturated alkyd molding composition in which the filler is used is believed to be due to the inability of a mineral filler to absorb the melamine-formaldehyde resin.

The present invention is based upon the discovery that although kaolin particles, like other mineral fillers, are incapable of absorbing a melamine-formaldehyde resin and can only be coated with a thin film of the resin, nevertheless, the use of a melamine-formaldehyde resin for coating kaolin particles produces a very important improvement in the water resistance and electrical properties of articles molded from a polymerizable unsaturated alkyd molding composition in which such a coated filler is used, in contrast to the insignificant improvement in the water resistance and electrical properties of articles molded from a cellulose-filled polymerizable unsaturated alkyd molding composition that is produced by impregnating the cellulose filler with a melamine-formaldehyde resin.

The remarkable improvement in the water resistance and electrical properties of molded articles that is obtained in the practice of the present invention has been demonstrated as follows:

A molding composition of the invention was prepared as follows:

A reaction mixture of a heterocyclic polyamine (544 grams of melamine), formalin (1028 grams of a 37 per cent commercial aqueous formaldehyde solution) and water (2600 grams) was heated at a temperature of 80 degrees C. for ten minutes. The pH of the resulting resin was then adjusted to 6.8 by adding lactic acid (0.3 cc. of a 10 per cent solution) before cooling the resin to 60 degrees C. The resin was then diluted with warm water (6250 grams), and kaolin (8150 grams) was stirred in. The resulting slurry was then drum dried at temperatures ranging between 200 and 350 degrees F. The dried material was removed from the heated drums by a scraper blade and was finely pulverized by ball milling. The resulting resin-coated kaolin particles (360 grams) were mixed in a Banbury mixer with a polymerizable binder, consisting of 87.5 grams of a polymerizable unsaturated alkyd (prepared, by the procedure hereinafter described, by esterifying 1.0 mol of ethylene glycol with 0.2 mol of phthalic anhydride and 0.8 mol of maleic anhydride to an acid number of 35) and 47.1 grams of a polymerizable unsaturated liquid monomer (diallyl diglycolate); 5.4 grams of "Luperco ATC" catalyst (a paste consisting of 50 per cent benzoyl peroxide and 50 per cent tricresyl phosphate); and 10 grams of a lubricant (zinc stearate). The mixing was continued until a soft, homogeneous dough was obtained. The material was then passed through warm rubber rolls to form sheets of a thickness of approximately ⅛ inch. The resulting molding composition is hereinafter referred to as composition A.

For the sake of comparison, the procedure described in the preceding paragraph was repeated except that the filler employed did not comprise the resin-coated kaolin particles prepared in accordance with the present method, but comprised 360 grams of ordinary kaolin. The resulting molding composition is hereinafter referred to as composition B, and is the control composition used in the tests described below.

Samples of the sheets of compositions A and B were molded for one minute under one to four tons of pressure per square inch of projected area in a mold heated with steam at 75 pounds gauge pressure to produce small disks (2 inches in diameter) suitable for testing water resistance. Water resistance varies with the amount of moisture that an artcile is capable of absorbing because the degree of deterioration upon exposure to moisture varies with the amount of moisture absorbed. The disks were immersed in water, and the water absorption was measured as the gain in weight (in grams) during immersion. In Table 1 below, the water absorption is given for tests in which test pieces made from molding composition A (column 2) and control molding composition B (column 3) were immersed in boiling water for one hour (line 1), or in cold water for 24 hours (line 2) or 48 hours (line 3) or 7 days (line 4).

The Barcol hardness of a disk molded from each composition was determined both before (line 5) and after (line 6) the disk was immersed in boiling water for one hour. Standard "Barcol" hardness apparatus was employed in this test, and hardness was read from a dial gauge which gave hardness readings as compared to an arbitrary standard.

TABLE 1

| Col. 1 | Col. 2 | Col. 3 |
|---|---|---|
| | Molding Composition | |
| | A | B (control) |
| 1. Abs. boiling water, 1 hr | .025 | .055 |
| 2. Abs. cold water, 24 hrs | .010 | .030 |
| 3. Abs. cold water, 48 hrs | .015 | .050 |
| 4. Abs. cold water, 7 days | .030 | .110 |
| 5. Barcol Hardness (original) | 66 | 59 |
| 6. Barcol Hardness (after boiling) | 60 | 48 |

As the results in Table 1 indicate, a molding composition of the invention (A) in which the filler comprises kaolin particles coated with a melamine-formaldehyde reaction product can be molded to produce articles which absorb considerably less water than articles molded from an unsaturated alkyd molding composition in which the filler comprises ordinary kaolin (control B). Furthermore, after exposure to high humidity, the Barcol hardness of articles molded from a composition of the invention is greater than that of articles molded from a composition comprising an ordinary kaolin filler. In fact, the resistance to hydrolysis of articles molded from a composition of the invention is so superior that such articles show better retention of electrical properties after exposure to high humidity than articles molded from a composition which comprises an ordinary kaolin filler.

Insulation resistance is one of the most important qualifications of a synthetic resin for use in electrical applications. Insulation resistance may be defined as the resistance offered to the flow of a current when a voltage is impressed between two electrodes embedded in a hardened composition at a standard distance (i. e., 1¼ inches between the centers of the electrodes in the standard test used to measure the insulation resistance of compounds embodying the invention). Ordinarily, polymerized alkyd compositions containing a filler are particularly subject to deterioration in insulation resistance when exposed to high relative humidities and high temperatures. However, compounds embodying the invention, which comprise a polymerized unsaturated alkyd and a resin-coated kaolin filler, are greatly improved in the retention of their insulation resistance.

In an accelerated test used to determine the retention of insulation resistance by compositions embodying the invention, the polymerized compositions were exposed to high relative humidities and high temperatures for prolonged periods of time to promote the breakdown of their insulation resistance. The superiority of the retention of insulation resistance by compositions embodying the invention has been demonstrated by tests carried out as follows:

The insulation resistance was determined by measuring the resistance (in megohms) offered to the flow of a current when a voltage was impressed between two electrodes so embedded in a molded article that there was a distance of 1¼ inches between the centers of the electrodes. Molded articles of compositions A and B were exposed to high temperatures and high relative humidities for given periods of time, and the insulation resistance was tested after exposure of the samples to such conditions. (The initial insulation resistance of each sample was over one million megohms.) The results of the insulation resistance tests after exposure to a temperature of 160 degrees F. and a relative humidity of 95 per cent for two days (line 1), three days (line 2), seven days (line 3), 14 days (line 4) and 21 days (line 5) are given in Table 2 (below).

TABLE 2

| Insulation Resistance | A | B (control) |
|---|---|---|
|  | Meg. | Meg. |
| 1. 2 days | 4,700 | 180 |
| 2. 3 days | 1,800 | 100 |
| 3. 7 days | 370 | 10 |
| 4. 14 days | 157 | 1.1 |
| 5. 21 days | 67 | 1.2 |

As the results in Table 2 indicate, the retention of insulation resistance by a composition of the invention (A) comprising a resin-coated kaolin filler is highly superior to the retention of insulation resistance by a composition (B) which is the same except that it contains an ordinary kaolin filler.

A molding composition of the invention that gives molded articles having superior water resistance and electrical properties comprises, as a binder, (a) a polymerizable unsaturated alkyd whose molecule contains a plurality of polymerizably reactive $\Delta^{2,3}$-enedioyl groups, and, as a filler therefor, (b) kaolin particles coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom.

The fact that the superior water resistance and electrical properties of articles molded from a polymerizable unsaturated alkyd molding composition of the invention in which the filler comprises kaolin particles coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, are not obtained by merely incorporating the same proportion of such a thermosetting reaction product along with the kaolin in a molding composition has been demonstrated as follows:

A reaction mixture of a heterocyclic polyamine (9 parts of melamine), formalin (17.4 parts) and water (206.6 parts) was heated to 80 degrees C. and held at that temperature for ten minutes, the pH being adjusted to 6.8 to 7.0 with dilute lactic acid as soon as a clear solution was obtained. The resulting resin solution was then cooled to 60 degrees C. before stirring in kaolin (135 parts) to make a relatively thin slurry. This slurry was then spray dried at an air inlet temperature of 500 to 600 degrees F. and an air outlet temperature of about 275 degrees F. The resulting finely-divided resin-coated kaolin particles (329 grams) were mixed in a Banbury mixer with a polymerizable binder consisting of 144.3 grams of the polymerizable unsaturated alkyd and 77.7 grams of the polymerizable unsaturated liquid monomer described above in the preparation of composition A; a catalyst (8.9 grams of "Luperco ATC"); a lubricant (14 grams of zinc stearate); and chrysotile fibers (140 grams). The mixing was continued until a soft, homogeneous dough was obtained. The material was then passed through warm rubber rolls to form sheets of a thickness of approximately ⅛ inch. The resulting molding composition of the invention is hereinafter referred to as composition C.

For the sake of comparison, a composition was prepared by the same procedure as C except that ordinary kaolin (329 grams) was used. This control composition is hereinafter referred to as D. Another control composition was prepared by the same procedure as D except that a heterocyclic polyamine-formaldehyde resin (33 grams of Melmac 404, a commercial melamine-formaldehyde unfilled molding resin, ground to a fine powder in a jar mill and then cured almost to the point of infusibility by baking in an oven) was also incorporated in the Banbury mixer. The resulting molding composition is hereinafter referred to as E.

Samples of compositions C, D, and E were molded and tested by the procedures hereinbefore described for composition A. The results of these tests are shown in Table 3 below:

TABLE 3

|  | Molding Composition | | |
| --- | --- | --- | --- |
|  | C | D (control) | E (control) |
| 1. Abs. boiling water, 1 hr | .0425 | .0625 | .065 |
| 2. Abs. cold water, 24 hrs | .025 | .0175 | .0225 |
| 3. Abs. cold water, 48 hrs | .0325 | .0475 | .0475 |
| 4. Abs. cold water, 7 days | .08 | .0975 | .105 |
| 5. Barcol Hardness, after boiling | 56 | 50 | 54 |
| 6. Insulation Resistance: | | | |
| 2 days meg | 123 | 2 | 5 |
| 5 days meg | 25 | 0.25 | 0.5 |

As the results in Table 3 indicate, essentially no improvement in water resistance or electrical properties is obtained by merely incorporating a heterocyclic polyamine-formaldehyde resin in a polymerizable unsaturated alkyd molding composition which contains a filler comprisig kaolin (i. e., composition E shows no improvement in properties over composition D which contains no melamine-formaldehyde resin). On the other hand, a very substantial improvement is obtained when the heterocyclic polyamine-formaldehyde resin is used to coat the kaolin filler before the filler is incorporated (i. e., as in composition of the invention C). Thus, as these results indicate, the coating of the kaolin particles with the thermosetting heterocyclic polyamine-formaldehyde resin is an essential feature of the present method whereby molding compositions having superior water resistance and electrical properties are obtained.

*Heterocyclic polyamine-formaldehyde reaction product*

For the sake of brevity, a substance whose molecule has a plurality of $NH_2$ groups each connected to a carbon atom contained in a heterocyclic ring, said carbon atom being connected by a double bond to an intracyclic nitrogen atom, is hereinafter referred to as a "heterocyclic polyamine."

The term "heterocyclic ring" is used herein to include triazole, diazine and triazine rings. When the heterocyclic ring in a heterocyclic polyamine that may be reacted with formaldehyde to form a thermosetting reaction product which may be used to coat kaolin particles in accordance with the present method comprises a triazole ring, the heterocyclic polyamine may be, e. g.:

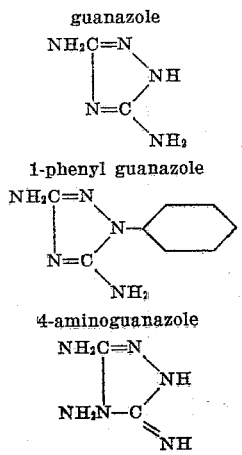

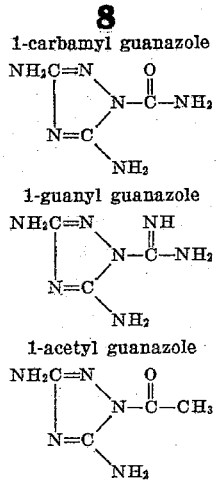

When the heterocyclic ring in a heterocyclic polyamine used in the practice of the invention comprises a diazine ring, the heterocyclic polyamine may be, e. g., a pyrimidine such as 2,4-diamino-6-hydroxy pyrimidine,

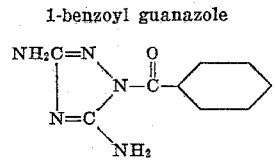

or a quinazoline such as 2,4-diaminoquinazoline,

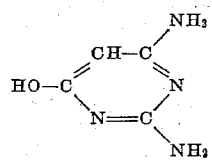

When the heterocyclic ring in a polyamine used in the practice of the invention comprises a triazine ring, the heterocyclic polyamine may be a substance whose molecule contains from one to three triazine rings, and has no functional groups attached to a triazine ring other than the amino groups (such as an amino triazine). The term "functional group" as used herein means any radical in a molecule of such a substance which may enter into undesirable side reactions that interfere with the reaction of formaldehyde with the amino triazine in the production of compositions of the invention (e. g., an OH group attached to a triazine ring may react with formaldehyde during the production of a thermosetting amino triazine-formaldehyde condensation product). A heterocyclic polyamine used in the practice of the invention that has one triazine ring in its molecule may be (1) a triamino triazine, e. g., melamine,

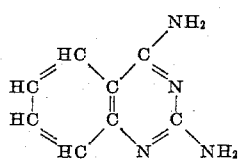

or (2) a diamino triazine (i. e., a monoguanamine) having the general formula

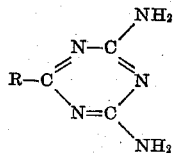

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with the guanamine in the practice of the invention. Such monoguanamines include, formoguanamine

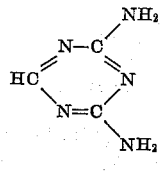

acetoguanamine

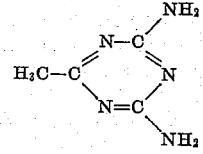

propioguanamine

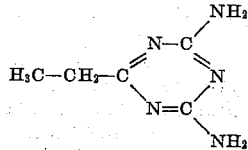

butyroguanamine

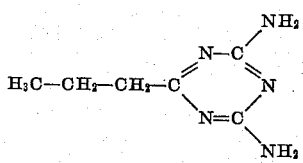

benzoguanamine

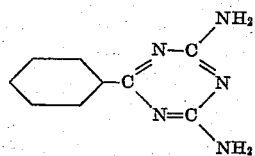

phenylacetoguanamine

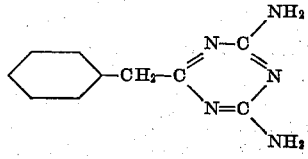

delta-cyano-valeroguanamine

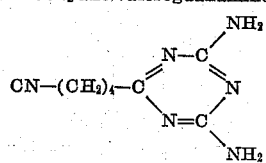

and monoguanamines obtained from the corresponding mononitriles containing as many as 18 carbon atoms, e. g., dodecano-, tetradecano-, or octadecano-nitrile.

A heterocyclic polyamine used in the practice of the invention that has two triazine rings in its molecule may be a diguanamine having the general formula

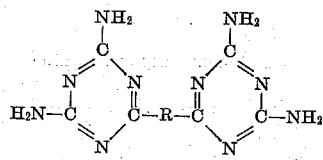

wherein R is a divalent hydrocarbon radical in which the shortest connection between the free valences is not more than eighteen carbon atoms in series, and which contains no substituents or contains substituents such as aliphatic, cycloaliphatic, aromatic, alkoxy, aryloxy and acyl radicals, or may be a compound having said general formula that is substituted on not more than two exocyclic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position, (b) not more than one monovalent radical of the benzene series on each substituted nitrogen atom having not more than eight carbon atoms in which the free valence is connected to the nucleus, and (c) not more than one monoalkoxy phenyl radical on each substituted nitrogen atom having not more than eight carbon atoms. Thus the diguanamines used may have varying structures and may be of complex structure so long as they do not contain groups which interfere with the condensation reaction of formaldehyde with the diguanamine in the practice of the invention. Such diguanamines include gamma-methyl-gamma-acetyl pimeloguanamine,

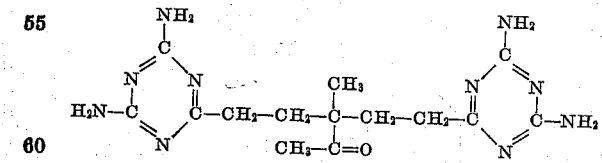

sebacoguanamine

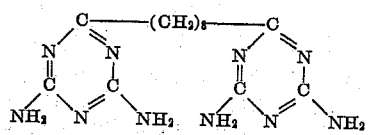

adipoguanamine

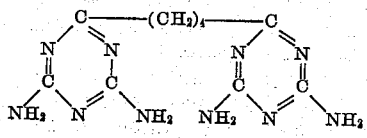

bis-(4,6-diamino-2-triazinyl-ethyl) fluorene

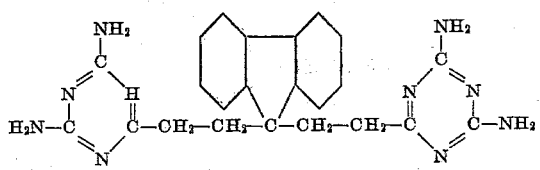

gamma-isopropenyl-gamma-acetyl pimeloguanamine

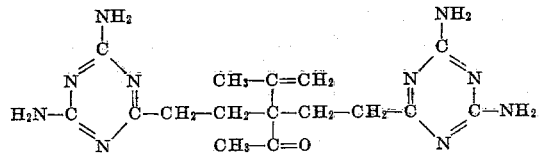

sym.-diphenyladipoguanamine

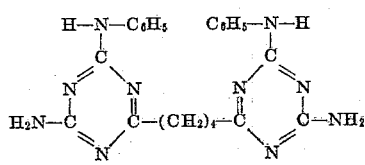

phthaloguanamine

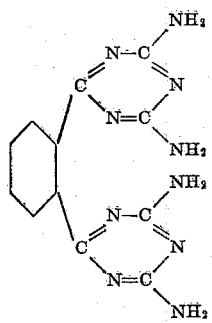

p,p'-bis-2,4-diamino-6-triazinyl diphenyl

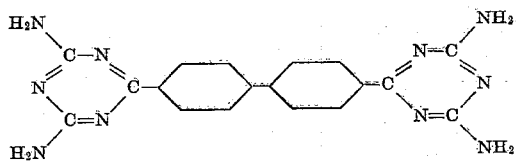

1,2-bis-2,4-diamino-6-triazinyl naphthalene

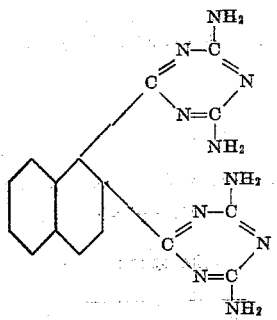

sym.-diphenylsebacoguanamine, sym.-di-p-phenetyladipoguanamine, sym.-di-o-tolyladipoguanamine, terephthaloguanamine and diguanamines obtained from nitriles such as 2,4-dicyanodiphenyl, 4,4'-dicyanodiphenyl methane, 4,4'-dicyanodiphenyl ethane, and 4,4'-dicyano-alpha, gamma-diphenyl propane.

A heterocyclic polyamine used in the practice of the invention that has three triazine rings in its molecule may be a triguanamine such as gamma-2,4-diamino-6-triazinyl-gamma-phenyl-pimeloguanamine

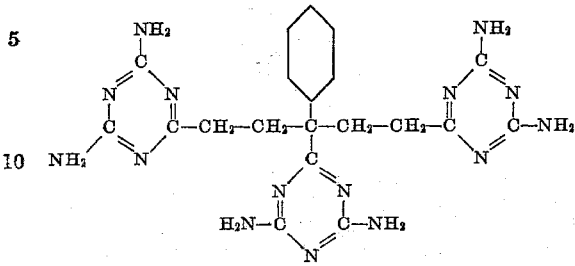

A guanamine which contains one or a plurality of 2,4-diamino-6-triazinyl radicals (e. g., a monoguanamine, diguanamine or triguanamine) may be prepared by condensing the corresponding mononitrile, dinitrile or trinitrile with dicyandiamide. The nitrile which reacts with the dicyandiamide must be a specific type of nitrile, namely, a nitrile whose molecule contains a cyano radical attached to a saturated carbon atom. In other words, the carbon atom to which the cyano group is attached must not be unsaturated and must not become unsaturated under the reaction conditions. In a nitrile used in a reaction with dicyandiamide as described herein, a nuclear carbon atom in an aromatic ring structure (e. g., an atom in a benzene nucleus) is considered to be saturated.

A mononitrile or polynitrile which may be used in the preparation of a guanamine for use in the present invention may be the nitrile corresponding to a monocarboxylic acid or a polycarboxylic acid, for example, any normal aliphatic carboxylic acid in the series from acetic acid to octadecanoic acid, or in the series from malonic acid to octadecane 1, 18-dicarboxylic acid, any benzene carboxylic acid, or an aromatic carboxylic acid containing two condensed benzene nuclei or two benzene nuclei connected directly or connected by from one to twelve atoms in series, a saturated or unsaturated alicyclic carboxylic acid, the dimer of linoleic acid, or an acid obtained by substituting in the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, azelaonitrile, octadecanedinitrile, benzonitrile, phthalonitrile, terephthalonitrile, cyanonaphthalene, dicyanonaphthalene, 2,4'-dicyanodiphenyl, 4,4'-dicyanodiphenyl methane, 4,4'-dicyanodiphenyl, 4,4'-dicyanodiphenyl ethane, 4,4'-dicyanoalphagammadiphenyl propane, 4,4'-dicyanodiphenyl ether, 4-cyanophenyl 4-cyanobenzyl ether, 4,4'-dicyanodibenzyl ether, the ethers formed by the reaction of two molecules of a hydroxy benzonitrile (e. g., 4-hydroxy benzonitrile) with one molecule of the dibromide corresponding to a glycol in the series from methylene glycol to decylene glycol or to diethylene or triethylene glycol, gamma-methyl-gamma-acetylpimelonitrile, gamma-isopropenyl-gamma-acetylpimelonitrile, bis-cyanoethyl fluorene, 4,4'-dicyanobenzophenone, phenylacetonitrile, gamma-cyano-gamma-phenylpimelonitrile and the dinitrile corresponding to the dimer of linoleic acid.

In the preparation of guanamine by the condensation of a nitrile with dicyandiamide, widely different molal proportions may be used. However, in the preparation of a monoguanamine the preferred proportion ranges from about 1 mol to about 1.5 mols of dicyandiamide for each mol of the nitrile (preferably a mononitrile) and the best results are obtained when the molal proportion is about 1.2 mols of dicyandiamide for each mol of the nitrile. In the preparation of a diguanamine the preferred proportion ranges from about 2.2 to about 2.6 mols of dicyandiamide for each mol of the nitrile (i. e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i. e., about 3.6 mols) for each mol of the nitrile (i. e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether, adding the nitrile and the dicyandiamide in a proportion within the range hereinbefore described, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When the precipitation of the guanamine is complete, the precipitate is filtered off and washed with boiling water to remove excess dicyandiamide and products of side reactions. The guanamine may be purified by converting it to a hydrochloride and neutralizing an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as, for example, sym.-diphenyl-adipoguanamine, hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate and adipyl chloride or the dichloride of any other dicarboxylic acid in chlorobenzene. Another method consists in reacting any of the aforementioned aryl or alkyl aryl biguanides or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

A thermosetting heterocyclic polyamine-formaldehyde reaction product may be obtained by reacting a heterocyclic polyamine, as hereinbefore defined (or a mixture of such amines), either with formaldehyde or with a polymer thereof, such as paraformaldehyde. When used for this reaction, paraformaldehyde is considered to split up so that the substance actually taking part in the reaction is formaldehyde. The heterocyclic polyamine may be reacted with a solution of formaldehyde in water, in an organic solvent such as alcohol, or in a liquid containing both water and an organic solvent. A water solution is usually preferred. The reaction may be performed in an autoclave, if desired, to secure a reaction temperature above the boiling point of the solvent. Ordinarily, the heterocyclic polyamine is added to a commercial aqueous formaldehyde solution having a pH of about 4, or to such a solution which has been made less acid, or neutral, or alkaline, preferably at a pH between 6 and 8, by addition of any desired base, such as sodium hydroxide, ammonium hydroxide, borax or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine in the preparation of a resinous reaction product for the coating of kaolin particles in the practice of the invention are 2:1 for guanazole or 1-carbamyl guanazole, 4:1 for 3,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few additional minutes thereafter.

When the reaction between formaldehyde and a heterocyclic polyamine is substantially complete, the solution of the reaction product is used to coat kaolin particles by the procedure hereinafter described. The preferred heterocyclic polyamine in the practice of the invention is melamine, since melamine-formaldehyde resin-coated kaolin particles used as a filler in accordance with the present method impart superior properties to molding compositions of the invention.

Preparation of resin-coated kaolin particles

For the sake of brevity, kaolin particles (i. e., particles of Georgia clay) which have been coated with a thermosetting reaction product of formaldehyde and a heterocyclic polyamine are referred to herein as "resin-coated kaolin particles." In the preparation of resin-coated kaolin particles, a heterocyclic polyamine-formaldehyde reaction product solution, prepared as hereinbefore described, is diluted with water or any suitable solvent so that the volume of the resin solution is such that it may be used to deposit only a very small amount of the resin as a coating on the kaolin, the extent of the dilution varying, of course, with the procedure employed for applying the resin to the kaolin, as is hereinafter further discussed. The dilution should be made carefully so that the resin does not precipitate as the water is added. It is desirable that before dilution the pH of the resin solution be adjusted (e. g., with dilute lactic acid) so that it is on the slightly acid side, so prevent precipitation of methylols upon dilution and to promote condensation of the resin that is employed.

When the reaction product has thoroughly coated the kaolin particles, it is desirable that the material be subjected to strong heating, since the heterocyclic polyamine-formaldehyde reaction product should be in at least a relatively advanced state of condensation. It is ordinarily desirable that the reaction product be in an infusible state, but at least the resin on the kaolin particles should be sufficiently condensed that neither water nor formaldehyde will be liberated during further processing operations in the preparation of a molding composition of the invention by the present method. Although the slightly acid pH of the coating solution may aid the cure initially, several hours of heating may be necessary at an elevated temperature to bring the resinous substance to a sufficiently advanced state of condensation (or to an infusible state, in accordance with the preferred procedure). Any desired method may be used to coat the kaolin particles with the resin, so long as care is taken to avoid agglomeration of the kaolin particles. Of course, the preferred procedures are those which result in the least change in the physical characteristics of the kaolin particles. For example, the kaolin may be stirred into a highly dilute solution of the desired resin to form a slurry that can be readily atomized for spray drying to obtain finely-divided resin-coated kaolin particles, or the slurry can be vacuum drum-dried and ball-milled or hammer-milled to a finely pulverized form. Alternatively, a dilute resin solution may be absorbed on the kaolin particles in a mixer and the resulting mass dried on trays at an elevated temperature (e. g., at about 160 degrees F.) before grinding it to the desired particle size by any known procedure.

The proportion of a heterocyclic polyamine-formaldehyde reaction product solution used to coat kaolin particles may vary with the specific reaction product employed as well as with the degree of improvement in properties that is desired. Ordinarily, it is preferred that approximately 2 to 30 per cent of the final dry coated kaolin particles consist of the thermosetting heterocyclic polyamine-formaldehyde reaction product (preferably in its infusible state), and it is most desirable that from about 5 to about 15 per cent of the final dry coated kaolin particles consist of the reaction product. (The terms "per cent" and "parts" are used herein to mean per cent and parts by weight unless otherwise specified.)

If the heterocyclic polyamine used is one that reacts so rapidly with formalin that the reaction product reaches the insoluble stage almost immediately after the reactants are mixed and heated, (guanazole is an example of such a heterocyclic polyamine) it is preferable simply to mix the polyamine and the formalin at room temperature and then to add the water of dilution, and the acid to adjust the pH. The relatively clear solution so obtained is then mixed with the kaolin particles, which are thoroughly dried in accordance with any of the procedures hereinbefore described. In this case, the reaction between the heterocyclic polyamine and the formaldehyde actually takes place on the kaolin particles during the drying operation.

Polymerizable unsaturated alkyd

In the preparation of a molding composition of the invention by the present method, a filler comprising resin-coated kaolin particles, prepared as hereinbefore described, is mixed with a polymerizable unsaturated alkyd whose molecule contains a plurality of polymerizably reactive $\Delta^{2,3}$-enedioyl groups. Such an unsaturated alkyd is a polyester prepared by reaction of one or more polyhydric alcohols with one or more polycarboxylic acids having in the molecule at least one polymerizably reactive $\Delta^{2,3}$-enoyl group, having the structure

Thus, the polymerizable unsaturated alkyd is one having polymerizably reactive $\Delta^{2,3}$-enoyl groups contained in dioyl radicals (connecting polyhydric alcohol residues through ester linkages), which dioyl radicals may therefore be defined as $\Delta^{2,3}$-enedioyl radicals (e. g., butenedioyl radicals such as maleyl or fumaryl radicals). The proportion of polyhydric alcohols having more than two hydroxy groups, such as glycerol or pentaerythritol, and the proportions of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). For the purpose of the instant invention it is to be understood that the term "unsaturated alkyd" means an alkyd that is polymerizable into an infusible or high melting point resin; so the proportion of unsaturated components should be such that the alkyd contains an average of at least three double bonds per molecule.

The present invention is applicable to all polymerizable unsaturated alkyds. Preferably, the alkyd is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render the $\Delta^{2,3}$-enoyl groups polymerizably non-reactive. The alkyd may be an ester of a polycarboxylic acid with any glycol, such as any polymethylene glycol in the series from ethylene glycol to decamethylene glycol, propylene glycol, any butylene glycol, any polyethylene glycol, in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane. Also the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantetrol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid.

In the practice of the invention the preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear alkyd for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the alkyd during the esterification reaction.

The molecular weight of the polymerizable unsaturated alkyds for use in the practice of the invention may vary over a wide range, depending upon the initial reacting ingredients and upon the degree of reaction obtained in the preparation of the alkyds. An alkyd used in the practice of the invention may have a molecular weight ranging from as low as about 500 to as high as about 5000, but ordinarily the molecular weights of preferred polymerizable unsaturated alkyds used in the present invention are in the lower portion of the range; for example, the molecular weight of an alkyd prepared from ethylene glycol, maleic anhydride and small amounts of propylene glycol and phthalic anhydride usually is within the range from about 700 to about 2000.

The number of repeating units in a polymerizable unsaturated alkyd chain, i. e., the number of acid and alcohol residues in the chain-like molecules of the alkyd, may also vary, and alkyds having a high molecular weight have corresponding long chain molecules. In general, in a polymerizable alkyd used in the practice of the invention the number of repeating units in the alkyd chains may range from about 3 to about 25. However in preferred alkyds used in the present invention there are usually from about 4 to about 15 units in the alkyd chains. Assuming that there is substantially no cross-linking in such polymerizable unsaturated alkyds and that equivalent quantities of, for example, glycol and maleic acid are employed, the number of olefinic unsaturations attached to carbon atoms in the chains of such polymerizable alkyds is, of course, merely the number of acid residues in the alkyd chain. However, if part of the maleic acid is replaced by a saturated acid in the preparation of a polymerizable alkyd, the number of olefinic unsaturations is lower in proportion to the amount of saturated acid employed, even though the number of acid and alcohol units in the chain remains about the same. Other properties of the unsaturated alkyd, such as solubility in various solvents, also may be varied by selecting various reacting ingredients and varying their proportions. The infusibility, hardness and inertness of the product obtained by polymerization of the alkyd may be increased by varying the initial reacting ingredients to increase the average number of olefinic double bonds per molecule of the polymerizable alkyd.

In the preparation of the polymerizable unsaturated alkyd, any of the usual modifiers such as monobasic acids, monohydric alcohols and natural resin acids may be added. The larger the proportions of monobasic acids and monohydric alcohols, the lower is the average number of acid and alcohol residues in the resulting alkyd molecules, and the lower is the viscosity of the alkyd. On the other hand, the more nearly equal the molecular proportions of dibasic acid and dihydric alcohol, the greater is the average number of residues in the resulting alkyd molecules, and the greater is the viscosity. The proportions of ingredients used are those proportions that produce a polymerizable alkyd of the desired viscosity. In the practice of the invention it is desirable that the proportion of monobasic acids and monohydric alcohols be kept low enough to allow substantial growth of the chain-like molecules during preparation of the unsaturated alkyds, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterifies those end groups present in the existing alkyd chains and, therefore, only a small amount may be incorporated in the alkyd without having any deleterious effect upon the final product.

In the production of polymerizable unsaturated alkyd compositions in the practice of the invention, the proportion of monohydric alcohol or monobasic acid used is never above about 10 mol per cent of the acid or alcohol content. Ordinarily the proportion of monohydric alcohol or monobasic acid that may be incorporated in polymerizable unsaturated alkyds for use in molding compositions of the invention is not more than about 5 mol per cent of the alcohol or acid content, although alkyds used in casting compositions occasionally may contain a slightly higher proportion of monofunctional ingredients. However, polymerizable unsaturated alkyds for use in the practice of the invention usually contain not more than about 2 mol per cent of monofunctional acid or alcohol in order that such alkyds may be readily polymerized into infusible or high melting point resins.

The point to which the reaction of the ingredients is carried in the preparation of the polymerizable alkyd is simply that point at which the product has the desired consistency. The consistency or viscosity of the alkyd (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of said catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the alkyd, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable alkyd may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, an alkyd is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting alkyd is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable alkyd may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting alkyd is a very thick gum having an acid number of 53.

A polymerizable alkyd may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting alkyd is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable alkyd may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable alkyd may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 180 degrees to about 210 degrees F. A solution comprising one or more polymerizable unsaturated alkyds and a substance (or mixture of substances) having at least one polymerizably reactive $CH_2=C<$ group per molecule and having a boiling point above 80 degrees C. is particularly useful as a binder in the production of a molding composition of the invention in accordance with the present method. Although the latter substance may be partially polymerized before use, it is preferable that such substance be a monomer and it is desirable that such substance have a plurality of polymerizably reactive $CH_2=C<$ groups per molecule, the preferred $CH_2=C<$ groups being allyl groups. It is preferred also that such substance be copolymerizable with the unsaturated alkyd used. Such substances which are copolymerizable with a polymerizable unsaturated alkyd include styrene, o-methyl styrene, methyl methacrylate, methyl acrylate, diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

*Preparation of molding composition*

A molding composition of the invention produced in accordance with the present method comprises, as a binder, a polymerizable unsaturated alkyd (or solution thereof) of the type hereinbefore described and, as a filler therefor, resin-coated kaolin particles (as hereinbefore described). A catalyst for the polymerization of such unsaturated alkyd is ordinarily present in a molding composition of the invention, along with the usual additives such as molding lubricants, plasticizers and coloring matter, the amount used in the case of each of such additives being the usual amount consistent with its particular function in the molding composition.

The mixing of the resin-coated kaolin particles with a polymerizable unsaturated alkyd in accordance with the present method may be carried out by any of the known procedures. If the alkyd is very viscous, it may be necessary to incorporate the resin-coated kaolin particles in the alkyd on a heated two-roll (differential speed) rubber mill, or it may be desirable to heat the alkyd in order to reduce the viscosity sufficiently to permit the use of other mixing procedures. Ordinarily, the viscosity of the alkyd is such that kneading or equivalent mixing procedures may be used satisfactorily. In some cases it may be desirable to dilute the alkyd with a solvent in order to facilitate mixing with the resin-coated kaolin particles.

The function of the alkyd is that of a binder, and accordingly the proportion of the resin-coated kaolin particles in a molding composition embodying the invention may range from a very small proportion such as about 5 per cent to a very high proportion such as about 85 per cent. In general, the preferred range is from about 60 per cent to about 75 per cent of the composition, and the optimum results are obtained in the upper portion of such range.

Although kaolin particles coated with a thermo-setting reaction product of formaldehyde and a heterocyclic polyamine may be the sole filler in a polymerizable unsaturated alkyd molding composition embodying the invention, usually it is preferable to use a filler combination in which part of the filler consists of fibers of crystalline fibrous silicates consisting essentially of anhydrous silicates of divalent metals.

Crystalline silicate mineral fibers are obtained from relatively few families, the most important of which are the serpentines and the pyroboles. The most important fibrous serpentine is chrysotile, $3MgO.2SiO_2.2H_2O$, a hydrous silicate of magnesium, generally referred to simply as "asbestos" because of its industrial prevalence. The fibrous silicates that are preferably employed in the practice of the invention are anhydrous and are therefore distinguished from the serpentines, such as chrysotile, which are hydrous silicates. A mineral sometimes classified as a fibrous pyrobole is crocidolite, $Na_2O.Fe_2O_3.2FeO.6SiO_2$ (with up to about one mol of $H_2O$ of hydration). The fibrous silicates that are preferably used in the practice of the invention are silicates of divalent metals and are, therefore, distinguished from crocidolite which consists essentially of silicates of metals other than divalent metals.

Although the crystalline silicate mineral fibers which are preferably used in the practice of the invention (for the sake of brevity, hereinafter referred to simply as "silicate fibers") may be fibers of any one or more of the crystalline fibrous minerals consisting of anhydrous silicates of divalent metals, practically the only members of this group which are available for industrial purposes are members of the pyrobole family. The pyroboles that are preferably used as fillers in the practice of the invention along with the resin-coated kaolin particles are minerals consisting essentially of silicates of divalent metals having the general chemical composition:

$$MO.SiO_2$$

wherein M is a divalent metal; but they may also contain small amounts of monovalent metals (e. g., sodium or potassium) and trivalent metals (e. g., ferric iron and aluminum). Examples of the pyroboles that may be used in the practice of the invention include:

Diopside, $(Ca,Mg)O.SiO_2$, essentially a silicate of calcium and magnesium;
Wollastonite, $CaO.SiO_2$, a relatively pure silicate of calcium;
Anthophyllite, $(Mg,Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg,Fe)O.CaO.4SiO_2$, similar to tremolite, but containing at least 3 per cent by weight of FeO; and
Others descriptively named mountain leather and mountain cork.

The pyroboles are further classified in two distinct classes or families, viz. amphiboles and pyroxenes. According to J. W. Mellor in "Inorganic and Theoretical Chemistry" (Longmans, Green and Co., 1925) volume VI, pages 390 and 391, diopside and wollastonite are pyroxenes; and anthophyllite, tremolite and actinolite are amphiboles.

Fibrous pyroboles are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use as fillers, since such fibers usually contain a substantial amount of mineral impurities which affect deleteriously many of the properties of the hardened compositions. The necessity and extent of purification are determined by the nature of the impurities, their effect on the mechanical strength of molded articles and their damaging effect on the mold itself. Pyrobole fibers sufficiently purified for use as a filler may be obtained by carrying out a simple flotation process, e. g., by introducing water continuously into the bottom of a vessel equipped with an overflow and containing the pyrobole fibers, so that the impurities remain at the bottom of the vessel and the purified fibers float out with the overflowing water. If extreme purity of the fibers is required, tremolite fibers are preferred, since tremolite occurs naturally in a very pure state and often requires little or no further purification.

Fibrous pyroboles occur in various fiber lengths ranging up to as much as 7 inches, but the fiber lengths are reduced substantially in the ordinary milling process. Pyrobole fibers used as part of the filler in a molding composition of the invention are usually ground down to the size of ordinary fibrous fillers, i. e., the fiber lengths of groups No. 6 and No. 7 of the Canadian Asbestos classification, at which the fibers appear to the naked eye to be similar in form to sawdust.

A filler combination comprising silicate fibers and resin-coated kaolin particles performs an additional function in the practice of the invention by imparting better molding properties to a polymerizable unsaturated alkyd composition than the molding properties of a composition containing resin-coated kaolin particles as the sole filler. Another aspect of the invention resides in the discovery that the improved water resistance and electrical properties of articles molded from compositions of the invention are enhanced when the composition comprises both kaolin particles and silicate fibers coated with a heterocyclic polyamineformaldehyde reaction product. The silicate fibers may be coated with such reaction product by any of the procedures hereinbefore described for treating the kaolin particles, the proportion of the reaction product employed preferably being such that it comprises from about 2 to about 25 per cent of the final coated fibrous silicate filler, and most desirably about 5 to 15 per cent of the final coated fibrous silicate filler.

When a mixture of the resin-coated kaolin particles with silicate fibers (preferably, resin-coated silicate fibers) is employed as a filler in the preparation of a polymerizable unsaturated alkyd molding composition embodying the invention, the total proportion of filler may range from about 5 per cent to about 80 per cent of the composition, and the preferred proportion is from about 60 to about 70 per cent of the composition, the optimum results being obtained when the proportion of filler is in the upper portion of such range.

At least appreciable amounts of both the resin-coated kaolin particles and the silicate fibers (either untreated or resin-coated) should be used in such a filler combination in order to obtain the benefit of the improvements which are imparted by the fibrous component, as well as the improvements which are imparted by the resin-coated kaolin particles. In general, the proportion of resin-coated kaolin to silicate fibers in the filler mixture may range from the minimum proportion at which the effect of the resin-coated kaolin is noticeable (i. e., about 1:100) to the maximum proportion at which the effect of the mineral fibers is noticeable (i. e., about 6:1). The optimum results are obtained when the proportion of resin-coated kaolin to silicate fibers ranges from about 1:1 to about 2:1.

A composition of the invention in which the filler comprises a mixture of a base of a metal of group II of the periodic system and resin-coated kaolin particles (or mixtures thereof with silicate fibers, particularly resin-coated silicate fibers) is highly desirable. A base of a metal of group II, when incorporated in a molding composition of the invention, not only imparts a substantial improvement in the physical and chemical properties of the composition but also may enhance the improvement in the water-resistance and electrical properties of articles molded from such a composition that is obtained in the practice of the invention. The incorporation of such a metal base in a polymerizable unsaturated alkyd composition reduces substantially the stickiness of the composition and imparts to the composition a certain stiffness, thereby making the composition much easier to handle industrially. Also, such a metal base in a polymerizable alkyd composition reduces substantially the tendency of the composition to stain or corrode a steel mold. One of the functions of the metal base is the neutralization of the free carboxylic acid radicals in the alkyd (although the improvements obtained by the use of a metal base cannot be explained fully as being the result of such neutralization); therefore, a metal base, such as an oxide, which does not release a volatile material during neutralization is preferred.

The metals of group II of the periodic system include magnesium, calcium, zinc, strontium, cadmium, barium and mercury. It is believed that beryllium and radium are too rare and expensive to be considered, and, accordingly, the metals of group II having atomic weights between 10 and 220 are the metals from which the base is formed that may be used in the practice of the invention.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent, in part at least, upon the acid present. It is to be understood that the base of a metal of group II (as referred to herein) is one that is in fact a metal base with respect to the polymerizable alkyd which is present in the practice of the invention. In other words, the metal base is a compound which releases its cation to replace the hydrogen of the carboxy radicals in the polymerizable alkyd. Presumably, such a carboxy radical acts as an acid in that it displaces acids weaker than itself from their salts, but does not displace acids stronger than itself from their salts. However, the term "metal base" does not include those metal salts, such as zinc stearate, which are used as lubricants or other modifiers in an unsaturated alkyd resin, because the salts of such long chain (i. e., over 6 carbon atoms) carboxylic acids apparently are not reactive enough to release the metal cation to replace the hydrogen of the carboxy radicals.

It has been found that the metal base used in the practice of the invention must be the substitution product of a substance with a labile hydrogen atom, having a dissociation constant (for the hydrogen) at least as small as about $3 \times 10^{-7}$, in which the labile hydrogen atom has been replaced by a valence of a metal of group II. In other words, in order that a compound of such a metal may be basic, it must be a compound of such a metal with a substance having a dissociation constant (for the labile hydrogen atom) equal to or less than that of carbonic acid. The most common examples of such metal bases include the oxides, hydroxides, borates, carbonates, and alcoholates such as the methoxides and ethoxides of such metals.

The full benefit of the use of a base of a metal of group II of the periodic system in the practice of the invention is obtained simply by incorporating the metal base in the alkyd composition in the same manner as any filler, according to the procedures hereinbefore described. The metal base may be incorporated in the polyester in a separate step or at the same time as the fillers hereinbefore mentioned. In fact, although the metal base has several chemical functions, it also functions physically as part of the mineral filler. In determining the total amount of filler, the amount of metal base is added to the amount of other mineral filler used, and the total proportion of mineral filler thus calculated should be within the limits hereinbefore described.

In actual practice the amount of the metal base used may range from a mere appreciable amount based on the chemical function of the metal base (i. e., the slightest excess over that amount required to neutralize the alkyd, so that even with a theoretically complete reaction there would still be a slight amount of metal base present) to a maximum proportion which depends upon the properties of the individual metal base. The considerations involved include the alkalinity, chemical activity and solubility of the metal base, as well as the physical character of the metal base when it is considered merely as a portion of the mineral filler. Ordinarily the metal base is sufficiently inactive and insoluble so that the essential consideration in the determination of the maximum proportion is purely a physical matter, and such a base is considered a part of the filler. In a molding composition embodying the invention the preferred proportion of such a metal base ranges from about 2 per cent to about 20 per cent of the total filler.

In the practice of the invention a solution comprising one or more polymerizable unsaturated alkyds and one or more polymerizable monomeric compounds (i. e., monomeric substances having at least one polymerizably reactive $CH_2=C<$ group per molecule and having a boiling point above 80 degrees C.) is particularly advantageous, because the alkyd has desirable physical properties and hardens very rapidly, whereas the presence of the monomeric compound causes the polymerized product to be much more water resistant and insoluble. Moreover, the combination (solution) of the alkyd and the monomeric compound usually polymerizes much more rapidly than either of such substances alone. Such a solution usually contains about 5 to about 35 per cent of the polymerizable monomeric compound and about 95 to about 65 per cent of the polymerizable alkyd.

Since the polymerizable alkyd is fusible and plastic at relatively low temperatures, it is possible to adjust the amounts of catalysts and inhibiting agents so that the hardening at such temperatures takes place at a reasonable rate to allow ample opportunity for shaping and molding of composition. In this manner molding compositions may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals) such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of such substances, may be used as the curing catalyst.

The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, an alkyd prepared from maleic anhydride and diethylene glycol, in a molding composition of the invention containing about 3 per cent of benzoyl peroxide, may be cured at approximately the same rate as a molding composition, containing a similar alkyd prepared from fumaric acid and diethylene glycol, in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to dispense the polymerization catalyst in the filler mixture by grinding it with the fillers in a ball mill, for example, before the fillers are mixed with the alkyd. In some cases the fillers may be mixed with a solution (in a volatile solvent) of the polymerization catalyst and dried before the fillers are mixed with the alkyd.

The following examples illustrate the practice of the invention:

EXAMPLE 1

A molding composition of the invention may be prepared by the following procedure:

(a) A reaction mixture of a heterocyclic polyamine (109 grams of melamine), formalin (210 grams) and water (400 grams) is heated to a temperature of 80 degrees C. As soon as a clear solution is obtained, the pH is adjusted to 6.7 by adding lactic acid (0.7 cc. of a 10 per cent solution), and the heating is continued for a total time of ten minutes. The resin solution is then cooled to 60 degrees C. and diluted with water (400 grams). The resulting resin solution is then absorbed on kaolin (1816 grams) in a Hobart mixer to obtain a doughy mass which is then dried on trays at 160 degrees F. for four hours. The resulting material is then ground into chunks ½ inch or less in cross section, and the coarse product is then dried at 300 degrees F. for two hours before grinding it in a mill of the rotary knife cutter type, screening the resulting particles through a 35 mesh screen, and then ball milling the screened fines to obtain finely pulverized resin-coated kaolin. The resulting resin-coated kaolin particles (360 grams) are mixed in a Banbury mixer with a polymerizable binder, consisting of 87.5 grams of a polymerizable unsaturated alkyd (prepared, by the procedure hereinbefore described, by esterifying 1.0 mol of ethylene glycol with 0.2 mol of phthalic anhydride and 0.8 mol of maleic anhydride to an acid number of 35) and 47.1 grams of a polymerizable unsaturated liquid monomer (diallyl diglycolate); a catalyst (5.4 grams of "Luperco ATC"); and a lubricant (10 grams of zinc stearate). The mixing is continued until a soft homogeneous dough is obtained. The material is then passed through warm rubber rolls to form sheets of a thickness of approximately ⅛ inch. This composition is referred to as composition F in the tests described below.

(b) The procedure described in (a) is repeated except that the resin-coated kaolin particles used are prepared by the procedure hereinbefore described in the preparation of composition C. This composition is referred to as composition $F_1$ in the tests described below.

The compositions prepared by the procedures described in (a) and (b) above can be molded to produce articles having superior water resistance and electrical properties. This is evident from the results obtained (tabulated below) when samples of the sheets are molded into disks and tested for water resistance and insulation resistance by the procedures hereinbefore described. For the sake of comparison, the results obtained with control composition B, prepared as hereinbefore described, using ordinary kaolin, are repeated below. (The initial insulation resistance of each sample before exposure at 160 degrees F. and 95 per cent relative humidity is over 1,000,000 megohms.)

| | Molding Composition | | |
|---|---|---|---|
| | F | $F_1$ | B (control) |
| Abs. boiling water, 1 hr | .025 | .020 | .055 |
| Abs. cold water, 24 hrs | .015 | .015 | .030 |
| Abs. cold water, 48 hrs | .020 | .020 | .050 |
| Abs. cold water, 7 days | .040 | .035 | .110 |
| Barcol Hardness (original) | 63 | 63 | 59 |
| Barcol Hardness (after boiling) | 56 | 57 | 48 |
| Insulation Resistance (meg.): | | | |
| 2 days | 4,300 | 3,700 | 180 |
| 3 days | 4,300 | 3,000 | 100 |
| 7 days | 1,900 | 285 | 10 |

In the procedures described in (a) and (b) above, similar good results may be obtained when the heterocyclic polyamine which is reacted with formaldehyde to produce the resin for coating the kaolin particles is any of the heterocyclic polyamines hereinbefore described. For example, the resin-coated kaolin particles employed in (b) above may be prepared by one of the following procedures:

(a) A reaction mixture of a heterocyclic polyamine (10 parts of adipoguanamine), formalin (17.4 parts), water (100 parts) and ethylene glycol monomethylether (25 parts) is refluxed for about twenty minutes at a temperature of about 100 degrees C. to obtain a clear, water-soluble resin having a pH of about 6.8. The resulting resin solution is then cooled, the pH is adjusted to about 6.0 by addition of dilute lactic acid, and kaolin (135 parts) is stirred in to produce a relatively thin slurry. This slurry is then spray dried at an air inlet temperature of 500 to 600 degrees F. and an air outlet temperature of about 275 degrees F. to obtain fine resin-coated clay particles.

(b) A reaction mixture of a heterocyclic polyamine (17 parts of benzoguanamine) and formalin (17.4 parts) is heated to the boiling point. After the reaction mixture has boiled for about three minutes substantially all of the benzoguanamine is dissolved and the hot solution is then diluted with methanol (80 parts) and water (100 parts) to obtain a clear solution having a pH of about 6.8 to 7.0. The resulting resin solution is cooled before adjusting the pH to 6.0 with dilute lactic acid and kaolin (135 parts) is stirred in to produce a relatively thin slurry, which is spray dried as described in the preceding paragraph.

EXAMPLE 2

A composition of the invention in which the filler comrises kaolin particles and silicate fibers (as hereinbefore defined), both coated with a heterocyclic polyamine-formaldehyde reaction product, may be prepared as follows:

A reaction mixture of a heterocyclic polyamine (109 grams of melamine), formalin (210 grams) and water (400 grams) is heated to a temperature of 80° C. As soon as a clear solution is obtained, the pH is adjusted to 6.7 by adding lactic acid (0.7 cc. of a 10 per cent solution), and the heating is continued for a total time of ten minutes. The resin solution is then cooled to 60° C. and diluted with water (3200 grams). The resulting dilute solution is then absorbed on silicate fibers (2093 grams of anthophyllite fibers) in a Hobart mixer, and the resulting treated fibers are then dried on trays at 160 degrees F. for approximately 48 hours. A mixture of the resin-coated fibers (1320 grams) and resin-coated kaolin particles (2900 grams, prepared by the procedure described in Example 1(a)) is mixed in a Banbury mixer with a polymerizable binder, consisting of 1281 grams of a polymerizable unsaturated alkyd (prepared, by the procedure hereinbefore described, by esterifying 1.0 mol of ethylene glycol with 0.2 mol of phthalic anhydride and 0.8 mol of maleic anhydride to an acid number of 35) and 690 grams of a polymerizable unsaturated liquid monomer (diallyl diglycolate); a catalyst (78.8 grams of "Luperco ATC"); a lubricant (132 grams of zinc stearate); and 330 grams of zinc oxide. The mixing is then continued until a soft homogeneous dough is obtained. The material is passed through warm rubber rolls to form sheets of a thickness of approximately ⅛ inch. This composition is referred to as composition G in the tests described below.

For the sake of comparison, a composition similar to composition G is prepared except that a mixture of ordinary untreated kaolin (2100 grams) and anthophyllite fibers (1000 grams) is used as the filler and the proportions of the other ingredients are as follows: 1031 grams of the polymerizable unsaturated alkyd, 555.5 grams of diallyl diglycolate, 63.5 grams of "Luperco ATC" catalyst, 250 grams of zinc oxide, and 100 grams of zinc stearate. This composition is used as a control in the tests described below and is referred to as composition H.

Composition G can be molded to produce articles having water resistance and electrical properties that are superior to such properties of composition H. This is evident from the results obtained (tabulated below) when samples of sheets of each composition are molded into disks and tested for water resistance and insulation resistance by the procedures hereinbefore described.

|  | Molding Composition | |
|---|---|---|
|  | G | H (control) |
| Abs. boiling water, 1 hr | .025 | .045 |
| Abs. cold water, 24 hrs | .015 | .025 |
| Abs. cold water, 48 hrs | .020 | .040 |
| Abs. cold water, 7 days | .040 | .085 |
| Barcol Hardness (original) | 62 | 65 |
| Barcol Hardness (after boiling) | 56 | 52 |
| Insulation Resistance (meg.): |  |  |
| 1 day | 17,500 | 550 |
| 4 days | 3,200 | 350 |
| 7 days | 1,300 | 340 |
| 14 days | 770 | 420 |
| 21 days | 710 | 250 |

EXAMPLE 3

A granular composition of the invention in which the filler comprises kaolin particles and silicate fibers (both coated with a heterocyclic polyamine-formaldehyde reaction product) may be prepared as follows:

A mixture of resin-coated silicate fibers (150 grams of resin-coated anthophyllite fibers prepared by the procedure described in Example 2) and resin-coated kaolin particles (190 grams, prepared by the procedure described in Example 1(a)) is mixed in a Banbury mixer with a polymerizable binder, consisting of 117.5 grams of a polymerizable unsaturated alkyd (prepared by esterifying a charge of 1.0 mol of moleic anhydride, 0.85 mol of monoethylene glycol, 0.2 mol of propylene glycol and an amount of hydroquinone equal to 0.06 per cent of the charge, by the procedure hereinbefore described to an acid number of about 30) and a polymerizable unsaturated liquid monomer (12.5 grams of diallyl phthalate); a catalyst (5 grams of "Luperco ATC"); zinc oxide (25 grams); and a lubricant (10 grams of zinc stearate). The mixing is continued until a soft, homogeneous dough is obtained. The material is then passed through warm rubber rolls to form sheets of a thickness of approximately ⅛ inch. The sheets are allowed to solidify fully while at a temperature between 80 and 90 degrees F. and are then granulated in a high speed cutter to a maximum particles diameter of about ⅛ inch. This composition is referred to as composition I in the tests described below.

For the sake of comparison, a second granular molding composition is prepared by the procedure described above, except that ordinary, untreated anthophyllite fibers and kaolin are used. This control composition is referred to as composition J in the tests described below.

Composition I can be molded to produce articles having water resistance and electrical properties that are superior to such properties of composition J. This is evident from the results obtained (tabulated below) when samples of each granular composition are molded into disks and tested for water resistance and insulation resistance by the procedures hereinbefore described.

|  | Molding Composition | |
| --- | --- | --- |
|  | I | J (control) |
| Abs. boiling water, 1 hr | .040 | .055 |
| Abs. cold water, 24 hours | .010 | .020 |
| Abs. cold water, 48 hours | .015 | .024 |
| Abs. cold water, 7 days | .030 | .049 |
| Barcol Hardness (original) | 59 | 59 |
| Barcol Hardness (after boiling) | 48 | 48 |
| Insulation Resistance (meg.): |  |  |
| 1 day | 67,000 | 1,700 |
| 7 days | 12,000 | 130 |
| 14 days | 1,250 | 2.5 |
| 21 days | 770 | 1.2 |
| 28 days | 700 |  |

In the procedures described in Examples 2 and 3, any other amphibole fibers (e. g., tremolite fibers) or any pyroxene fibers (e. g., wollastonite fibers) may be used in place of the anthophyllite fibers to obtain similar results.

Having described the invention, I claim:

1. A method of producing a molding composition that gives molded articles having superior water resistance and electrical properties, which comprises coating kaolin particles with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom, and then mixing the coated kaolin particles with a polymerizable unsaturated alkyd whose molecule contains a plurality of polymerizably reactive $\Delta^{2,3}$-enedioyl groups.

2. A method as claimed in claim 1 wherein the substance is melamine.

3. A molding composition that gives molded articles having superior water resistance and electrical properties, comprising, as a binder, (a) a polymerizable unsaturated alkyd whose molecule contains a plurality of polymerizably reactive $\Delta^{2,3}$-enedioyl groups, and, as a filler therefor, (b) kaolin particles coated with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom.

4. A molding composition as claimed in claim 3 wherein the substance is melamine.

5. A molding composition that gives molded articles having superior water resistance and electrical properties, comprising, as a binder, (a) a polymerizable unsaturated alkyd whose molecule contains a plurality of polymerizably reactive $\Delta^{2,3}$-enedioyl groups, and, as a filler therefor, (b) kaolin particles coated with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom, and (c) fibers of crystalline fibrous silicates consisting essentially of anhydrous silicates of divalent metals.

6. A molding composition that gives molded articles having superior water resistance and electrical properties, comprising, as a binder, (a) a polymerizable unsaturated alkyd whose molecule contains a plurality of polymerizably reactive $\Delta^{2,3}$-enedioyl groups, and, as a filler therefor, (b) kaolin particles and (c) fibers of crystalline fibrous silicates consisting essentially of anhydrous silicates of divalent metals, both the kaolin particles and said fibers being coated with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom.

7. A molding composition as claimed in claim 6 wherein the substance is melamine.

DAVID E. CORDIER.

No references cited.